D. H. NORRIS.
APPARATUS FOR SEPARATING THE METALLIC AND ROCKY CONSTITUENTS OF ORES.
APPLICATION FILED APR. 5, 1915.
1,167,835.
Patented Jan. 11, 1916.
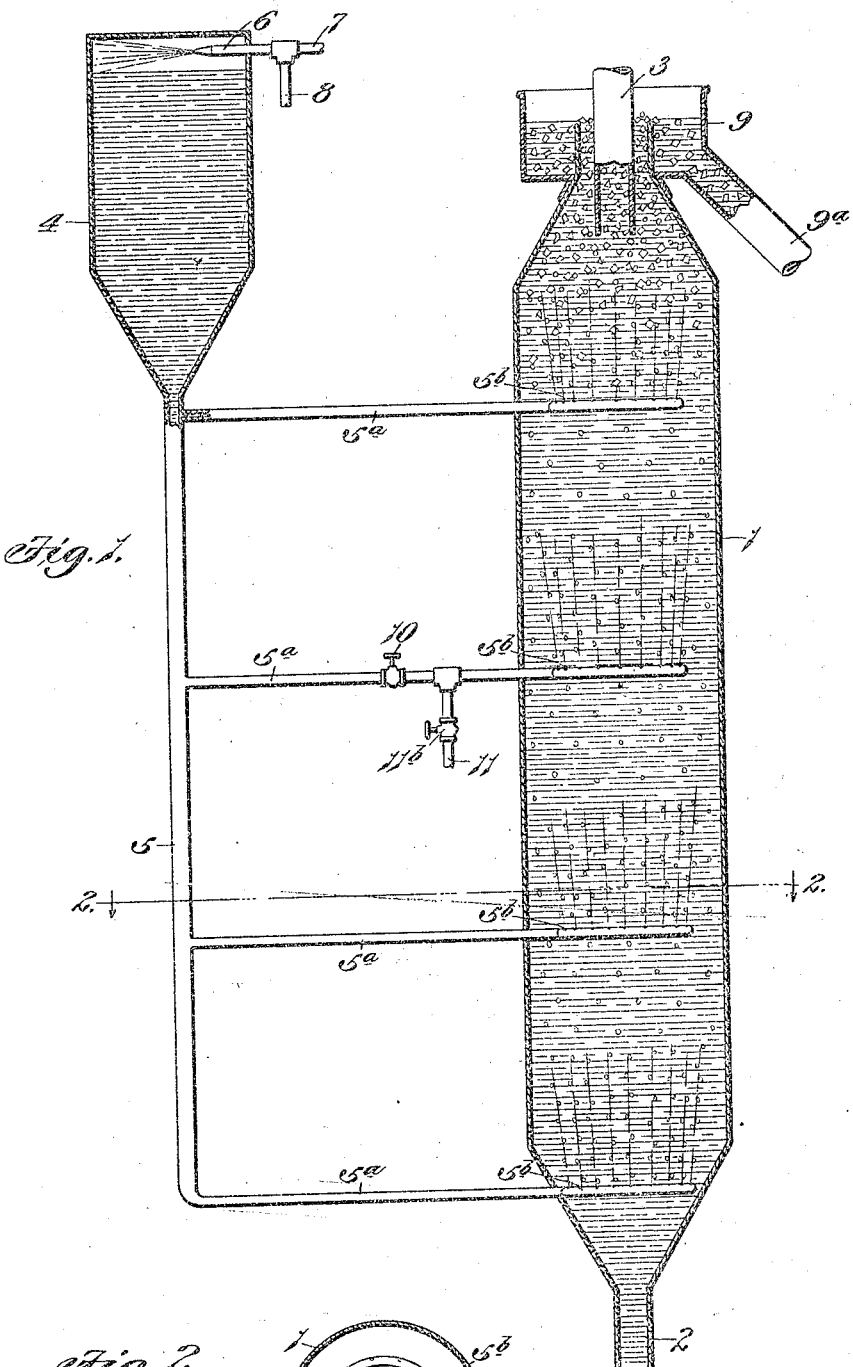
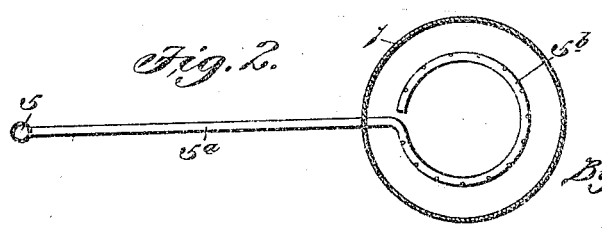

UNITED STATES PATENT OFFICE.

DUDLEY H. NORRIS, OF SAN FRANCISCO, CALIFORNIA.

APPARATUS FOR SEPARATING THE METALLIC AND ROCKY CONSTITUENTS OF ORES.

1,167,835. Specification of Letters Patent. Patented Jan. 11, 1916.

Application filed April 5, 1915. Serial No. 19,314.

*To all whom it may concern:*

Be it known that I, DUDLEY H. NORRIS, a citizen of the United States, residing at San Francisco, California, have invented a certain new and useful Improvement in Apparatus for Separating the Metallic and Rocky Constituents of Ores, of which the following is a full, clear, and exact description, such as will enable others skilled in the art to which it appertains to make and use the same.

This invention relates to the concentration of metallic ores.

In my prior United States Patent #973,586, dated December 10, 1907, I have described an apparatus for separating the metallic and rocky constituents of ores which comprises means for introducing water containing air in solution into a mixture of crushed ore and water, so as to cause nascent bubbles of air to form continuously in said mixture and rise to the surface thereof to carry off the metallic particles of the ore, the metallic particles which are carried to the surface by said air bubbles being collected and saved for further metallurgical treatment.

The object of my present invention is to provide an apparatus which is an improvement on the apparatus described in my prior patent above mentioned, in that it insures the recovery of a great percentage of the metallic particles of the ore being treated and also tends to eliminate the necessity of re-treating the ore or running it through the separating apparatus several times.

To this end I have devised an apparatus for treating metallic ores which comprises means for introducing aerated water or water containing air in solution into a flowing mixture of pulverized ore and water at a number of different levels or at a number of points intermediate the inlet and outlet of the container through which the mixture flows. The diminution of the pressure on the air charged water when said water comes in contact with the flowing mixture releases the bubbles of air contained in the aerated water, thereby causing small nascent bubbles of air to form continuously in the mixture. Said bubbles of air attach themselves to the metallic particles of the ore, and as said bubbles rise upwardly through the mixture, they carry the metallic particles of the ore to the surface of the mixture.

In view of the fact that aerated water or water containing air in solution is introduced into the mixture at a number of different levels, or at a number of different points along the path of travel of the mixture, the recovery of a relatively great percentage of the metallic particles of the ore is assured, on account of the fact that any bubbles of air which are dissolved by the water in the mixture before said bubbles reach the surfaces are replaced by the bubbles of air created by the aerated water that is introduced into the mixture at a different point from the point where the dissolved bubbles were formed. In other words, in the apparatus herein described, the mixture of crushed ore and water flows through a number of zones, each of which is supplied continuously with water containing air in solution. If the bubbles of air created at one of the lower zones, in a vertical apparatus, dissolve before they reach the surface of the mixture, the bubbles of air created at a higher zone will compensate for the bubbles that have dissolved, or, in other words, continue the upward movement of the metallic particles of the ore to which the dissolved bubbles were attached. The container through which the mixture flows is preferably arranged vertically and made comparatively high, and sufficient aerated water zones are provided to insure practically a complete separation of the metallic and rocky constituents of the ore before the mixture reaches the outlet of the container, thereby tending to eliminate the necessity of re-treating the mixture or running it through the apparatus several times.

If desired, oil can be mixed with the pulverized ore and water which forms the mixture being treated, or oil, an emulsifying or other material, may be introduced into the aerated water and thus introduced into the flowing mixture, but this is not essential to the successful operation of my apparatus and forms no part of my present invention.

The apparatus herein shown, which forms the subject-matter of my present invention, is intended to be used for practising the method described and claimed in my pending application Serial No. 19,313, filed April 3, 1915.

Figure 1 of the drawings is a vertical sectional view of my improved apparatus, and Fig. 2 is a horizontal sectional view taken on the line 2—2 of Fig. 1.

Said apparatus consists of a tank 1, preferably conical-shaped at its opposite ends and provided at its lower end with a discharge pipe 2. A pipe 3 that projects into the upper end of the tank or container 1 leads from a mixer (not shown) in which pulverized ore and water or pulverized ore, oil and water are thoroughly mixed together. Aerated water, or water containing air in solution, is introduced into the container 1 at a number of levels. In the apparatus herein shown an aerated water supply pipe 5 is provided with branches $5^a$, each of which leads to a water discharge device $5^b$ arranged inside of the container 1, said devices $5^b$ preferably consisting of hollow ring-shaped members provided with orifices through which jets of aerated water are discharged into the mixture that flows downwardly through the container 1.

It is immaterial, so far as my present invention is concerned, how the water that is supplied to the pipe 5 is charged with air, but one convenient way of accomplishing this is to connect the pipe 5 to the lower end of a closed receptacle 4 into which water and air under pressure are introduced by means of a nozzle 6 to which an air pipe 7 and water pipe 8 lead. The upper end of the tank or container 1 is open to the atmosphere, so that the jets or streams of aerated water which are introduced into the flowing mixture in said container by the devices $5^b$ will cause infinitesimally small nascent bubbles of air to form continuously and rise upwardly through the mixture in said container, thus carrying to the surface of said mixture the metallic particles of the ore. If the mixture that is introduced into the tank 1 contains oil the oil will rise to the surface of the mixture with the metallic particles of the ore and flow over the upper edge of the tank 1 into a cup 9 from which a discharge conduit $9^a$ leads. The water in the mixture and the water that is introduced into the tank 1 by the devices $5^b$ escapes through the discharge outlet 2 at the lower end of the tank with the rocky particles of the ore.

In an apparatus of the construction above described practically all of the metallic particles of the ore are recovered, owing to the fact that small nascent bubbles of air are being formed continuously in the mixture and at different levels or at different zones through which the mixture passes in traveling through the container 1. If the bubbles created by the aerated water that is introduced into the lower portion of the container 1 by the bottom device $5^b$ dissolve before they reach the surface of the mixture, the metallic particles of ore to which said bubbles are attached and which are being carried upwardly through the mixture will not fall or cease to move upwardly, because the bubbles of air that are created at one of the higher zones compensate for or take the place of the dissolved bubbles, and thus continue the upward movement of the metallic particles of the ore which were started on their upward travel by the dissolved bubbles.

The tank or container 1 is preferably made comparatively high and a sufficient number of the devices $5^b$ are preferably provided to insure practically a complete separation of the metallic and rocky constituents of the ore in one treatment, thereby overcoming the necessity of re-treating the mixture or running it through the apparatus several times.

While I prefer to use all of the devices $5^b$ for supplying aerated water to the mixture, one of said devices $5^b$, preferably the one located near the middle of the container 1, may be used as a suction device for the purpose of removing or drawing off slimes or other material in the mixture that are in a state of suspension. Therefore, I have provided the apparatus with a valve 10 for cutting off the middle device $5^b$ in the container from the aerated water supply line 5 and have provided a suction line 11 equipped with a controlling valve $11^b$ that is combined with the intermediate device $5^b$ in the container in the manner shown in the drawings, the valve 10 being closed and the valve $11^b$ opened when it is desired to use the intermediate device $5^b$ for the purpose of drawing off slimes or other material in the mixture that are in a state of suspension.

Having thus described my invention, what I claim, and desire to secure by Letters Patent, is:

1. An apparatus for separating the metallic and rocky constituents of ores comprising means for introducing water containing air in solution into a flowing mixture of crushed ore and water at a number of different points along the path of travel of the mixture so as to cause nascent bubbles of air to form continuously in said mixture and rise to the surface thereof to carry off the metallic particles of the ore.

2. An apparatus for separating the metallic and rocky constituents of ores, comprising a member that forms a passageway, means for causing a mixture of crushed ore ing a member that forms a passageway, and means for discharging aerated water into said passageway at a number of different zones so as to cause nascent bubbles of air to be created in the mixture for the purpose of carrying the metallic particles of the ore upwardly to the surface of the mixture.

3. An apparatus for separating the metallic and rocky constituents of ores, comprising a vertically-disposed container whose upper end is open, means for supplying a mixture of crushed ore and water to said container, said container being provided with a discharge outlet at its lower end, and means for introducing water containing air in solution into said container at a number of different levels so as to cause infinitesimally small nascent bubbles of air to form continuously in the mixture and pass upwardly through same so as to carry the metallic particles of the ore upwardly to a point where they can be collected.

4. An apparatus for separating the metallic and rock constituents of ores, comprising a member that forms a passageway through which a mixture of pulverized ore and water is adapted to flow, and means for causing said mixture to be subjected repeatedly to the action of aerated water at different zones in the passageway while the mixture is passing through the same.

5. An apparatus for separating the metallic and rocky constituents of ores, comprising a container through which a mixture of crushed ore and water is adapted to flow, means for introducing water containing air in solution into the lower portion of said container so as to create small nascent bubbles of air in the mixture which rise upwardly through same, and an independent means for creating small nascent bubbles of air at a higher point in the container so as to compensate for the bubbles of air that start at the lower portion of the container but which dissolve during their upward travel through the mixture.

6. An apparatus for separating the metallic and rocky constituents of ores, comprising a vertically-disposed container through which a mixture of pulverized ore and water is adapted to flow, a plurality of water-discharging devices arranged intermediate the inlet and outlet of said container, and means for supplying aerated water or water containing air in solution to said devices.

7. An apparatus for separating the metallic and rocky constituents of ores, comprising a vertically-disposed container whose upper end is open to the atmosphere and which is provided at its lower end with a discharge outlet, means for supplying a mixture of crushed ore and water to the upper portion of said container, means for charging water with air, means for introducing said aerated water into said container at a number of different levels so as to create infinitesimally small nascent bubbles of air in the mixture that flows through said container.

8. An apparatus for separating the metallic and rocky constituents of ores, comprising a member that forms a passageway through which a mixture of ore and water is adapted to flow, means for introducing aerated water into said member at a number of different zones so as to create small nascent bubbles of air in the mixture, and means arranged intermediate the inlet and discharge of said passageway for removing the slimes and other materials in the mixture that are in a state of suspension while the mixture is traveling through said passageway.

9. An apparatus for separating the metallic and rocky constituents of ores, comprising a passageway through which a mixture of crushed ore and water is adapted to flow, means for introducing aerated water into said passageway, an independent water-discharging device arranged intermediate the inlet and outlet of said passageway, and means whereby said device can be used either to supply aerated water to the mixture or to draw off slimes and other material in the mixture that are in a state of suspension.

10. An apparatus for separating the metallic and rocky constituents of ores, comprising a container through which a mixture of crushed ore and water is adapted to flow, means for introducing aerated water into the lower portion of said container, an independent water-discharging device arranged in the container intermediate the inlet and outlet of same, said device being connected to a supply of water that contains air in solution, a valve for cutting off said device from said water supply, a suction line leading to said device, and a valve for cutting off communication between said device and said suction line.

In testimony whereof I hereunto affix my signature in the presence of two witnesses, this 29 day of March, 1915.

DUDLEY H. NORRIS.

Witnesses:
O. A. EGGERS,
MYRON I. HOFFMAN.

It is hereby certified that in Letters Patent No. 1,167,835, granted January 11, 1916, upon the application of Dudley H. Norris, of San Francisco, California, for an improvement in "Apparatus for Separating the Metallic and Rocky Constituents of Ores," errors appear in the printed specification requiring correction as follows: Page 2, line 120, strike out the syllable and words "ing a member that forms a" and insert the words *and water to flow through said;* page 3, line 13, claim 4, for the word "rock" read *rocky;* and that the said Letters Patent should be read with these corrections therein that the same may conform to the record of the case in the Patent Office.

Signed and sealed this 1st day of February, A. D., 1916.

[SEAL.]

J. T. NEWTON,
*Acting Commissioner of Patents.*

Cl. 83–85.